(12) United States Patent
Yadav et al.

(10) Patent No.: US 12,423,264 B2
(45) Date of Patent: Sep. 23, 2025

(54) ATTRIBUTE BASED ASSET DISCOVERY FOR INTELLIGENT PROTECTION

(71) Applicant: Dell Products L.P., Round Rock, TX (US)

(72) Inventors: Sunil Yadav, Bangalore (IN); Aaditya Rakesh Bansal, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 171 days.

(21) Appl. No.: 17/957,422

(22) Filed: Sep. 30, 2022

(65) Prior Publication Data
US 2024/0111715 A1 Apr. 4, 2024

(51) Int. Cl.
*G06F 16/11* (2019.01)

(52) U.S. Cl.
CPC .................. *G06F 16/128* (2019.01)

(58) Field of Classification Search
CPC ...................................... G06F 16/128
See application file for complete search history.

(56) References Cited

U.S. PATENT DOCUMENTS

| | | | | |
|---|---|---|---|---|
| 8,352,431 B1* | 1/2013 | Protopopov | .......... | G06F 16/128 707/649 |
| 8,396,841 B1* | 3/2013 | Janakiraman | ......... | G06F 3/0608 707/802 |
| 9,678,981 B1* | 6/2017 | Taylor | ................... | G06F 16/182 |
| 2005/0091184 A1* | 4/2005 | Seshadri | .............. | G06Q 10/107 |
| 2009/0006535 A1* | 1/2009 | Tsaur | .................... | G06F 16/951 370/480 |
| 2010/0274765 A1* | 10/2010 | Murphy | .............. | G06F 11/1469 709/224 |
| 2010/0287219 A1* | 11/2010 | Caso | ..................... | G06F 16/134 717/176 |
| 2010/0333116 A1* | 12/2010 | Prahlad | ................. | G06F 3/0649 713/153 |
| 2014/0330800 A1* | 11/2014 | Shaath | .................. | G06F 16/125 707/694 |
| 2016/0147614 A1* | 5/2016 | Mittal | ................. | G06F 11/1446 707/615 |
| 2016/0323381 A1* | 11/2016 | Huang | ................ | H04L 67/1097 |
| 2021/0182160 A1* | 6/2021 | Sharma | .............. | G06F 11/1451 |

* cited by examiner

*Primary Examiner* — Marc S Somers
(74) *Attorney, Agent, or Firm* — Chamberlain, Hrdlicka, White, Williams & Aughtry; Aly Z. Dossa

(57) ABSTRACT

Embodiments of the invention relate to methods and systems for backing up user defined logical assets. In accordance with one or more embodiments, a user may define a logical asset type prior to a backup being performed. The user may define the logical asset type based on any rules, filters, or attributes of files and/or folders stored in a file system. Once the user has defined the asset type, the system may utilize file-system meta-data to quickly ascertain which files and folders meet the definition of the logical asset type, allowing for the backup of the user defined asset to be performed with minimal additional workload by the production hosts, clients, backup agents, and other associated components of the system.

5 Claims, 4 Drawing Sheets

ATTRIBUTE BASED ASSET DISCOVERY FOR INTELLIGENT PROTECTION

BACKGROUND

As people increasingly rely on computing systems and devices to perform a plethora of tasks; the systems have become increasingly complex, and the opportunities for failure and/or loss of important data has also increased. Frequently, backups of assets including important files and folders associated with an application are required. However, presently there is no simple method for a user to define an asset in such a way that logical groups of files and folders not specifically related to an application may be selected to be backed up together, such as, but not limited to, when a user wants a particular file type to be backed-up.

SUMMARY

In general, certain embodiments described herein relate to a method for backing up a user defined logical asset. The method comprises of receiving from a user a definition for a user defined logical asset. Once the definition is received, meta-data for a file system is retrieved and analyzed. The meta-data is analyzed to determine which files and folder that are stored in the file-system are associated with the user defined logical asset. The resulting subset of meta-data (also referred to as logical asset meta-data) is then stored in an asset meta-data database. Once the logical asset meta-data has been stored to an asset meta-data database, a request may be received for performing a backup on the user defined logical asset. At this time, the logical asset meta-data that had been stored in the asset meta-data database is retrieved and based on it, the files and folders that are associated with the logical asset meta-data are backed up.

In general, certain embodiments described herein relate to a non-transitory computer readable medium comprising computer readable program code, which when executed by a computer processor enables the computer processor to perform a method for backing up a user defined logical asset. The method comprises of receiving from a user a definition for a user defined logical asset. Once the definition is received, meta-data for a file system is retrieved and analyzed. The meta-data is analyzed to determine which files and folder that are stored in the file-system are associated with the user defined logical asset. The resulting logical asset meta-data is then stored in an asset meta-data database. Once the logical asset meta-data has been stored in an asset meta-data database, a request may be received for performing a backup on the user defined logical asset. At this time, the logical asset meta-data that had been stored in the asset meta-data database is retrieved and based on it, the files and folders that are associated with the logical asset meta-data are backed up.

In general, certain embodiments described herein relate to a system comprising: a production host that includes, a file-system, a processor, and a memory. The memory includes instructions, which when executed by the processor, perform a method for backing up a user defined logical asset. The method comprises of receiving from a user a definition for a user defined logical asset. Once the definition is received, meta-data for a file system is retrieved and analyzed. The meta-data is analyzed to determine which files and folder that are stored in the file-system are associated with the user defined logical asset. The resulting meta-data ("logical asset meta-data") is then stored in an asset meta-data database. Once the logical asset meta-data has been stored in an asset meta-data database, a request may be received for performing a backup on the user defined logical asset. At this time, the logical asset meta-data that had been stored in the asset meta-data database is retrieved and based on it, the files and folders that are associated with the logical asset meta-data are backed up.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
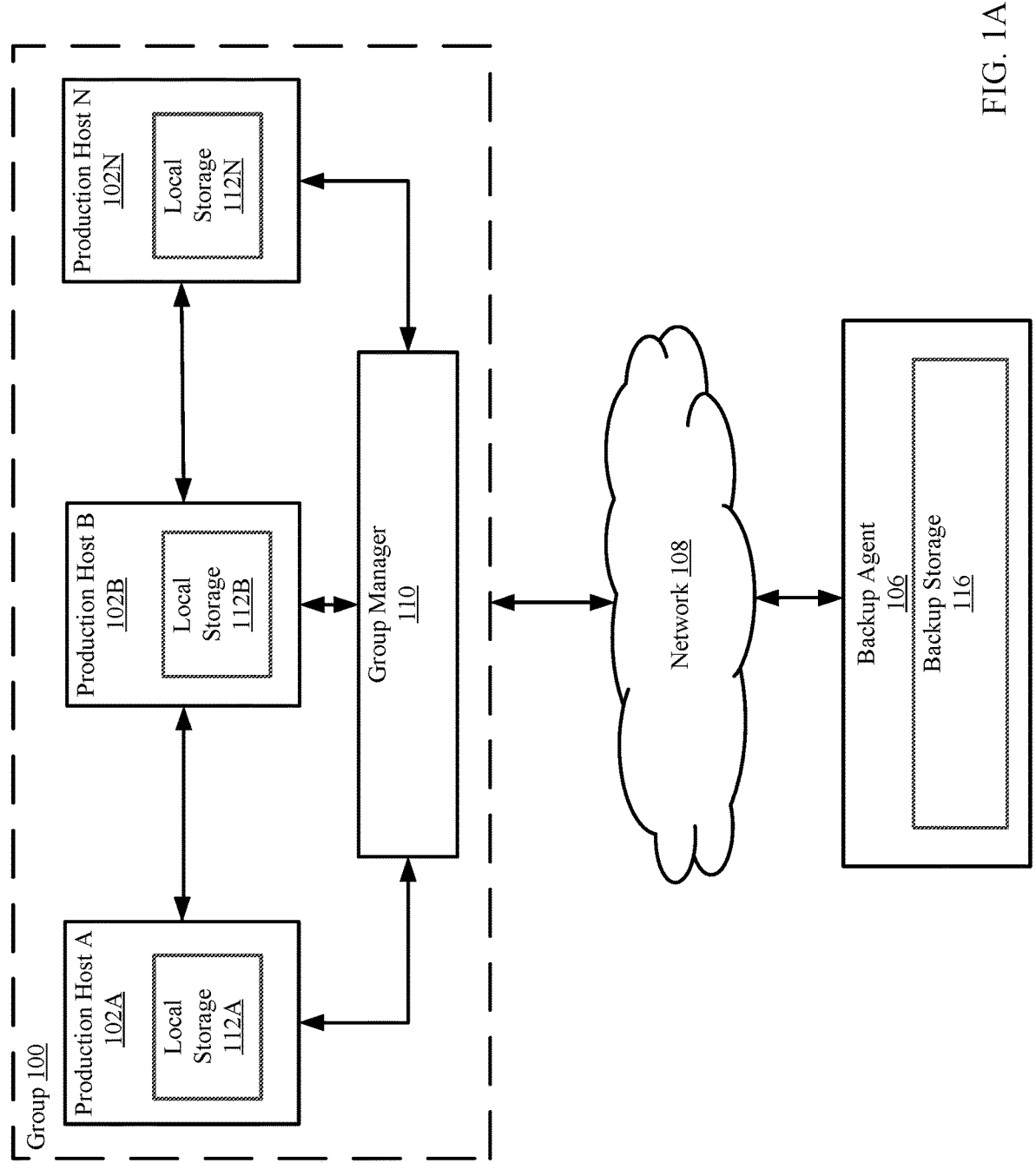
FIG. 1A shows a diagram of a system in accordance with one or more embodiments of the invention.

In the following description of the figures, any component described with regards to a figure, in various embodiments of the invention, may be equivalent to one or more like-named components described with regards to any other figure. For brevity, descriptions of these components will not be repeated with regards to each figure. Thus, every embodiment of the components of each figure is incorporated by reference and assumed to be optionally present within every other figure having one or more like-named components. Additionally, in accordance with various embodiments of the invention, any descriptions of the components of a figure are to be interpreted as an optional embodiment, which may be implemented in addition to, in conjunction with, or in place of the embodiments described with regards to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or preceded) the second element in an ordering of elements.

As used herein, the phrase "operatively connected," or "operative connection," means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In many traditional data protection and management solutions for client/server architectures, there are multiple clients/proxies and other network connected systems, which retrieve assets comprising of related files and/or folders from hosts located on the servers. Clients send a request for a desired asset on the host and then each client crawls the files and/or folders over the network to get a list of files and folders located on the host(s) that are associated with the desired asset. The files and folders that the client wants to access, such as for performing a backup, are grouped together based on their association with a specific application. However, many users want to backup files of a specific type or based on other criteria such as age, not based on what application they are associated with. Backing up an exceptionally large file-system in this way becomes increasingly difficult.

In accordance with one or more embodiments, a user may define a logical asset type prior to a backup being performed. The user may define the logical asset type based on any rules, filters, or attributes of files and/or folders stored in a file system. Once the user has defined the asset type, the system may utilize file-system meta-data to quickly ascertain which files and folders meet the definition of the logical asset type, allowing for the backup of the user defined asset to be performed with minimal additional workload by the production hosts, clients, backup agents, and other associated components of the system.

The following describes various embodiments of the invention.

FIG. 1A shows a diagram of a system in accordance with one or more embodiments of the invention. The system includes a group (100) that includes a plurality of hosts (e.g., 102A-102N) and a group manager (110). The system may include any number of hosts (e.g., 102A-102N) and groups (e.g., 100) without departing from the invention. For example, the system may include six hosts configured as two groups (not shown) that communicate through a network (108). The system also includes a backup agent (106) which may perform backups of assets located on any of the production hosts (e.g., 102A-102N). The system may include additional, fewer, and/or other components without departing from the invention. Each of the components in the system may be operatively connected via any combination of wireless and/or wired networks (108). Each component illustrated in FIG. 1A is discussed below.

In one or more embodiments of the invention, the group (100) interacts via a network (108) with one or more backup agents (e.g., 106). The backup agent (106) may be a separate computing system that coordinates backups and includes, in one or more embodiments of the invention, storage (e.g., 116) for storing a completed backup and other data. Alternatively, or in addition to, in one or more embodiments of the invention, the backup agents may be parts of the group manager (e.g., 110) or one or more production hosts (e.g., 102A-102N). Other configurations of the backup agents (e.g., 106) and the group (e.g., 100) may be utilized without departing from the invention.

In one or more embodiments of the invention, the backup agent (106) may generate and provide to the backup storage device (116) the backups and the historical meta-data based on backup policies implemented by the backup agent (106). The backup policies may specify a schedule in which assets associated with the production hosts (e.g., 102A-102N) are to be backed up. The backup agent (106) may be triggered to generate a backup along with backup meta-data and provide the backup and its meta-data to the backup storage device (116) in response to a backup policy. Alternatively, backup, and backup meta-data may be generated by the backup agent (106) and provided to the backup storage device (116) in response to a backup request triggered by a client (not-shown) or user of the system. In accordance with one or more embodiments of the invention, the backup request may specify a definition of a logical asset that the user or other client system desires to have back-up, the method of which is described in more detail below with regards to the method shown in FIG. 2.

In one or more embodiments of the invention, the backup agent (106) may periodically or in response to receiving a request for a backup of a user defined logical asset, or a stand-alone definition of a logical asset received from the user, perform a meta-data-based backup (MBB) of one or more file systems associated with the production hosts (e.g., 102A-102N). When performing an MBB, the backup agent (106) or equivalent component of the system, gathers the meta-data for all the files and folders of the file-systems associated with the production hosts (e.g., 102A-102N). This meta-data is then saved to each of the local storages (e.g., 112A-112N) of the production hosts (e.g., 102A-102N) for use in future backups as well as for other functions. Alternatively, the meta-data gathered during the MBB may be stored in backup storage (116) or in the group manager (110) or other storage that is part of the group (e.g., 100) or connected to the group (e.g., 100) via the network (e.g., 108).

Figure 2:
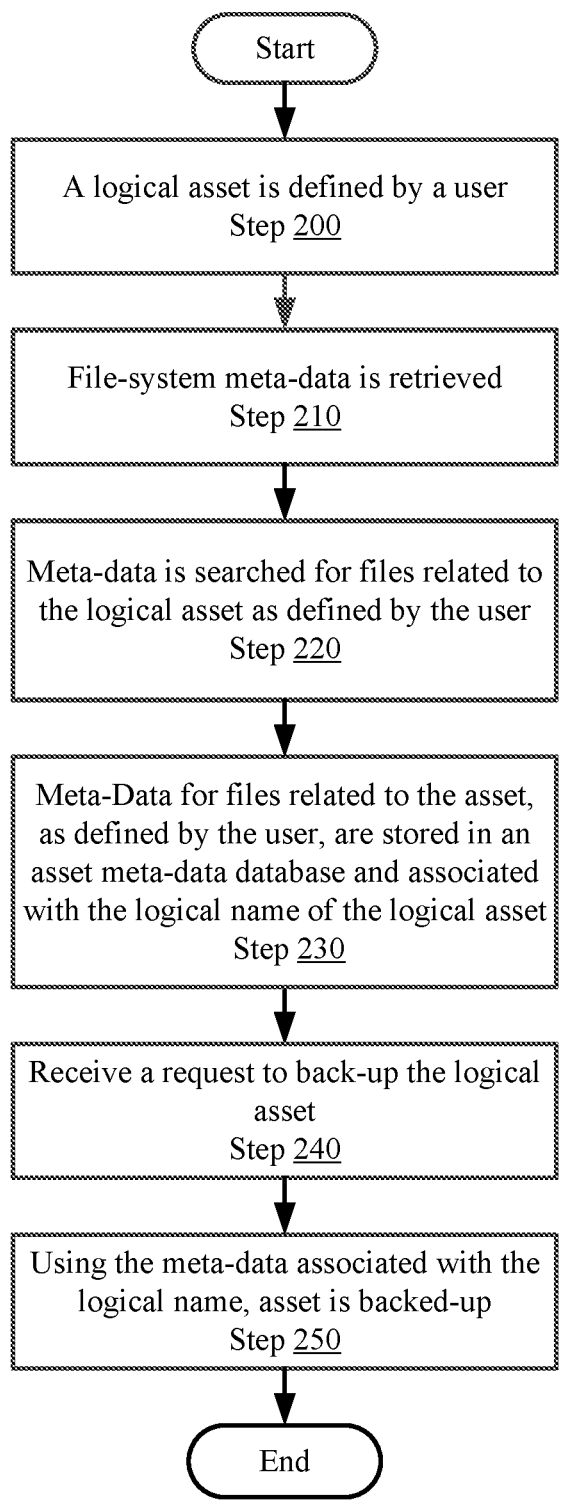
FIG. 2 shows a flowchart of a method of performing a backup of a user defined logical asset in accordance with one or more embodiments of the invention.

As described in more detail with regards to the method shown in FIG. 2, when the backup agent (106) receives a user definition such as rules, filters, and/or attributes for files and folders that the user wants to assign to a logical asset for future use, the backup agent (106) retrieves the meta-data that was gathered and stored previously by the MBB process. Alternatively, or in addition, where meta-data is gathered via a discovery process periodically, the backup agent when receiving the definition uses the meta-data gathered and stored from the discovery process.

Once the backup agent (106) obtains the meta-data, the backup-agent (106) analyzes the meta-data to ascertain which files and folders are related to the user defined logical asset. This data may then be used, as will be described in more detail below with regards to the method shown in FIG. 2, to perform a backup of the user defined asset.

In one or more embodiments of the invention, the backup agent (106) includes its own storage (116). The backup storage (116) may store data and/or files such as backup data and meta data, as well as definitions rules, procedures, and other pertinent information for performing backups of the production hosts (e.g., 102A-102N). The backup agent's storage (116) may include one or more processors, memory (e.g., random access memory), and persistent storage (e.g., disk drives, solid state drives, etc.). In one or more embodiments of the invention, the backup agent's storage (116) as well as the backup agent (106) itself, may also, or alternatively, comprise of off-site storage including but not limited to, cloud base storage, and long-term storage such as tape drives, depending on the particular needs of the user and/or the system.

In one or more embodiments of the invention, the backup agent (106) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (106) described throughout this application.

Figure 3:
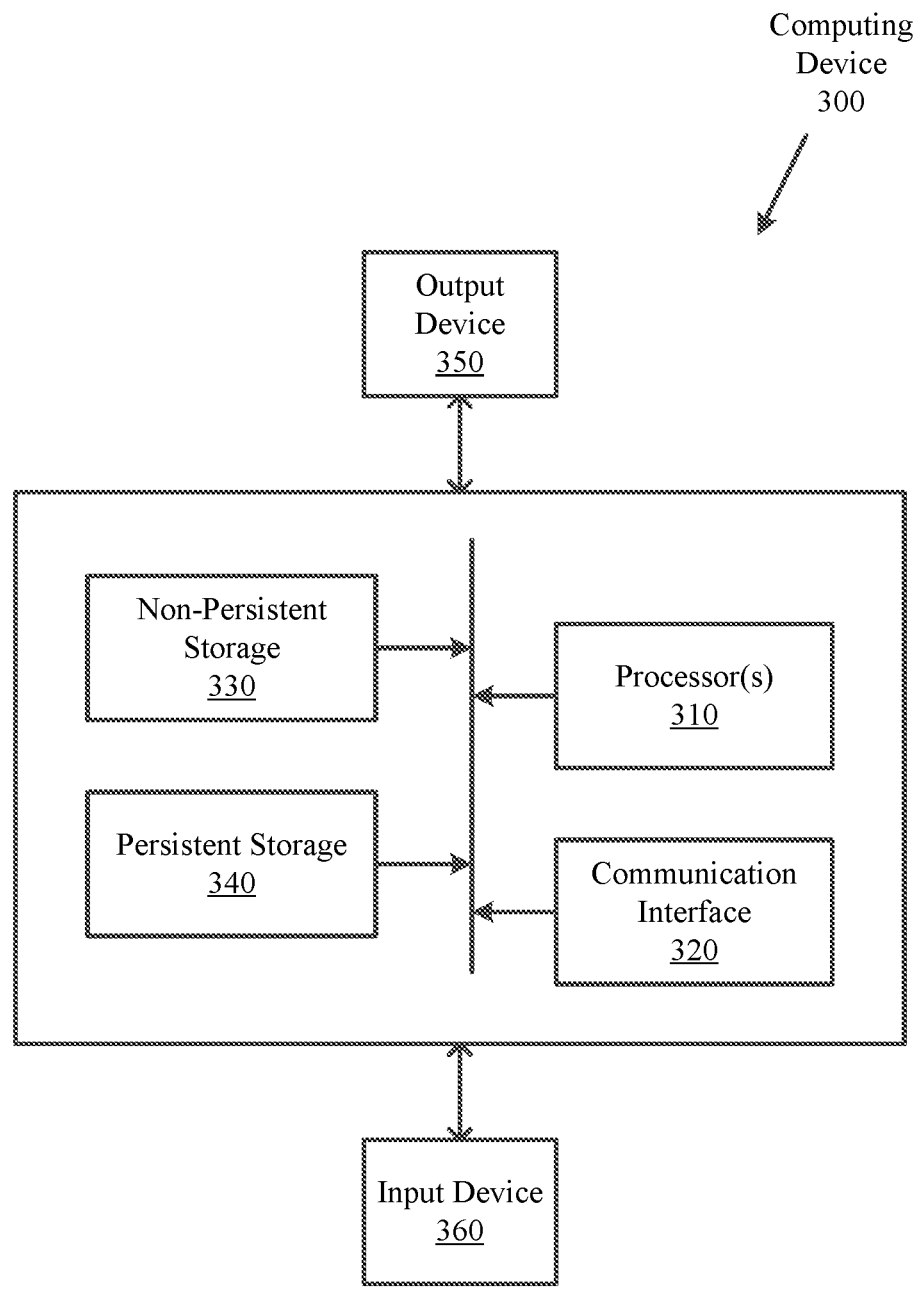
FIG. 3 shows a diagram of a computing device in accordance with one or more embodiments of the invention.

In one or more embodiments of the invention, the backup agent (106) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of a backup agent (e.g., 106) described throughout this application.

In one or more embodiments of the invention, the backup agent (106) is implemented as computer instructions, e.g., computer code, stored on a persistent storage that when executed by a processor of the production hosts (e.g., 102A-102N) causes the production hosts (e.g., 102A-102N) to provide the functionality of the backup agents (106) described throughout this application. Alternatively, in one or more embodiments of the invention the backup agent (106) may be implemented by the group manager (e.g., 110), a client (not shown) or other component of the system, which may provide the functionality of the backup agent (106) described through this application.

In one or more embodiments of the invention, the group (100) of hosts (e.g., 102A-102N), group manager (110), and the backup agent (106) communicate through a network (108). The network (108) may take any form including any combination of wireless and/or wired networks. The network (108) may be a local network (LAN) or a wide area network (WLAN) including the Internet or a private enterprise network that connects more than one location. The network (108) may be any combination of the above networks, other known network, or any combination of network types.

In one or more embodiments of the invention, the network (108) allows the group (100) to communicate with other groups (not shown) and external computing devices such as (but not limited to) a client and/or a backup agent (e.g., 106). The various components of the group (100) may also communicate with each other through a network. The network may be a high-speed internal network and/or include part of an external network (108). The production hosts (e.g., 102A-102N), and group manager (e.g., 110) communicate with each other over the internal network and in one or more embodiments of the invention provide fallback functionality.

A network (e.g., 108) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location or be distributed at any number of physical sites. In one or more embodiments, a network may be coupled with or overlap, at least in part, with the Internet.

In one or more embodiments, although shown separately in FIG. 1A, the network (108) may include any number of devices within any components (e.g., 100, 102A-102N, and 110) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples.

In one or more embodiments, network devices are configured to participate in one or more network protocols, which may include methods for backing up user defined logical assets such as the methods described in FIG. 2.

In one or more embodiments of the invention, a group (e.g., 100) may be implemented as one or more computing devices. A group (e.g., 100) may include any number of computing devices without departing from the invention. The group may include different computing devices, different quantity, and types of computer resources, and may perform different computer implemented services without departing from the invention.

In one or more embodiments of the invention, the group (100) includes a plurality of production hosts (e.g., 102A-102N) which include the functionality to obtain data protection services from the data protection manager (not shown) and/or the group manager (e.g., 110). While shown as containing only three production hosts (e.g., 102A-102N), the group (100) may include more or less production hosts without departing from the invention, for example a group (e.g., 100) could comprise of at least sixteen production hosts, at least fifty production hosts, or at least a hundred production hosts without departing from the invention.

Each host (e.g., 102A-102N) includes local storage (e.g., 112A-112N) for storing assets such as files and folders which may be made available to other hosts requesting target devices (e.g., 106). The local storage (e.g., 112A-112N) may include one or more processors, memory (e.g., random access memory), and persistent storage (e.g., disk drives, solid state drives, etc.). In one or more embodiments of the invention, the local storage (e.g., 112A-112N) may also or alternatively comprise of off-site storage including but not limited to, cloud base storage, and long-term storage such as tape drives, depending on the particular needs of the user and/or the system. The group may also contain shared storage including at least one group shared volume (CSV) (not shown) which is active with each of the production hosts (e.g., 102A-102N) of the group (100). Other types of shared storage may also or alternatively be included such as active-passive storage and local storage (e.g., 112A-112N).

In one or more embodiments of the invention, the production hosts (e.g., 102A-102N) perform workloads and provide services to clients and/or other entities not shown in the system illustrated in FIG. 1A. The production hosts (e.g., 102A-102N) may further include the functionality to perform computer implemented services for users (e.g., clients) of the group (100). The computer implemented services may include, for example, database services, electronic mail services, data processing services, etc. The computer implemented services may include other and/or additional types of services without departing from the invention.

During the performance of the aforementioned services, data may be generated and/or otherwise obtained. The production hosts (e.g., 102A-102N) include local storage (e.g., 112A-112N) which may include multiple volumes, as well as shared storage which may include group shared volumes (e.g., CSVs). The various data storage volumes (e.g., 112A-112C) performing data storage services may include storing, modifying, obtaining, and/or deleting data. The data storage services may include other and/or additional services without departing from the invention. The data generated and stored on the local storage (e.g., 112A-112N) by the production hosts (e.g., 102A-102N) may be valuable to users of the system, and therefore may be protected by the backup agent (106). The production hosts (e.g., 102A-102N), alternatively or in addition to the backup agent (106), may provide backup storage services and include backup storage on the local storage (e.g., 112A-112N). The backup storage services may include storing backups of data on the local storage (e.g., 112A-112N) for restoration purposes. The backup storage services may include other and/or additional services without departing from the invention.

The production hosts (e.g., 102A-102N) may include a primary production host (e.g., 102A) and secondary production hosts (e.g., 102B and 102N). The specific configuration of which production host is the primary production host and which production host is the secondary production host may be preconfigured or may be automatically managed by the group manager (e.g., 110). The production hosts (e.g., 102A-102N) may include any number of secondary production hosts without departing from the invention. Alternatively, all production hosts (e.g., 102A-102N) may be secondary production hosts with the group manager (e.g., 110) performing the additional tasks of the primary host.

The production hosts (e.g., 102A-102N), may be operably connected to one or more group shared storages and may obtain data storage services from the one or more group shared storages. The production hosts (e.g., 102A-102N) may be operably connected to each other, and each production host (e.g., 102A) may include the ability to use all or part of the volumes, including shared active-passive drives that form the local storage (e.g., 112A-112N) of the other production hosts (e.g., 102B and 102C).

In one or more embodiments of the invention, the production hosts (e.g., 102A-102N) are implemented as computing devices (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production hosts (e.g., 102A-102N) described throughout this application.

In one or more embodiments of the invention, the production hosts (e.g., 102A-102N) are implemented as logical devices. The logical devices may utilize the computing resources of any number of computing devices and thereby provide the functionality of the production hosts (e.g., 102A-102N) described throughout this application.

The production hosts (e.g., 102A-102N) as well as other components of the group and connected devices may perform data storage services. The data storage services may include storing, modifying, obtaining, and/or deleting data stored on the local and shared storages (e.g., 112A-112N) based on instructions and/or data obtained from the production hosts (e.g., 102A-102N) or other components of the group (e.g., 100). The data storage services may include other and/or additional services without departing from the invention. The local storages (e.g., 112A-112N) may include any number of storage volumes without departing from the invention.

The local and shared storages (e.g., 112A-112N) may include storage devices (not shown) for storing data. The storage devices may be physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the local and shared storages (e.g., 112A-11N) may utilize portions of any combination of hard disk drives, solid state disk drives, tape drives, and/or any other physical storage medium of any number of computing devices.

In one or more embodiments of the invention, the production hosts (e.g., 102A-102N) as well as the associated local storages (e.g., 112A-112N) are managed by a group manager (e.g., 110). The group manager (110) performs a plurality of functions not limited to managing and configuring the services provided by the production hosts (e.g., 102A-102N), managing the mapping and movement of data on the at least she shared volumes including any group shared volumes (e.g., 120). The group manager (110) may perform other functions attributed to other components of the system or function not described herein without departing from the invention.

In one or more embodiments of the invention the group manager (110) includes the functionality to perform a portion, or all of, the data protection services of the data protection manager (not shown). This may include performing discovery of the volumes and assets associated with the production hosts (e.g., 102A-102N) including those stored on the local storage (e.g., 112A-112N). This may also include performing, or initiate backups and restorations as well as other functions of the backup agent (e.g., 106) as well as the method described in the method shown in FIG. 2 and described below. The group manager (110) may include the functionality to perform and or obtain other and/or additional services without departing from the invention.

In one or more embodiments of the invention, the group manager (110) may perform discovery on the volumes and assets of the volumes and assets associated with the production hosts (e.g., 102A-102N) including those stored on the local storage (e.g., 112A-112N). The group manager queries each production host (e.g., 102A-102N) and their associated local and shared storage (e.g., 112A-112N). Using the results of the query, the group manager (110) produces an asset mapping, which is stored as file system meta-data on each of the production hosts (e.g., 102A-102N). This allows for each of the production hosts (e.g., 102A-102N) to know where a given asset is located at any given time. By updating the discovery periodically, such as, but not limited to, every fifteen seconds, the asset mapping may remain accurate and provide quicker access times with less or no inter-host messaging. Further if one production host fails, the location of at least the shared assets is not lost.

In one or more embodiments of the invention, the group manager (110) may in addition to, or instead of other components such as a data protection manager (not shown), a backup agent (e.g., 106) or a client (not shown), determine the preferred production host for performing of data protection such as a backup on a given asset such as a specific application and its data and/or an entire volume. This may be done during the periodic discovery, or as a result of a request for sharing an asset with a requesting target device, or performing a backup as described in more detail in the method shown in FIG. 2, or at any other configured time as configured by a user, administrator, or system designer/manufacturer.

In one or more embodiments of the invention, a group manager (e.g., 110) is a physical device. The physical device may include circuitry. The physical device may be, for example, a field-programmable gate array, application specific integrated circuit, programmable processor, microcontroller, digital signal processor, or another hardware processor. The physical device may be adapted to provide the functionality of the group manager (e.g., 110) described throughout this application.

In one or more embodiments of the invention, the group manager (110) is implemented as computer instructions, e.g., computer code, stored on a persistent storage that when executed by a processor of the group (e.g., 100) including any-one-of the production hosts (e.g., 102A-102N) to provide the functionality of the group manager (e.g., 110) described throughout this application.

In one or more embodiments of the invention, the group manager (110) is implemented as a computing device (see e.g., FIG. 3). A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor (s) of the computing device cause the computing device to perform the functionality of a group manager (e.g., 110) described throughout this application.

In one or more embodiments of the invention, the group manager (110) is implemented as a logical device. The logical device may utilize the computing resources of any number of computing devices and thereby provide the functionality of the group manager (e.g., 110) described throughout this application.

In one or more other embodiments of the invention, one or more of the functions of the group manager (e.g., 110, FIG. 1A) may be performed by a data protection manager (not shown), a backup agent (e.g., 106), the individual production hosts (e.g., 102A-102N, FIG. 1A), a requesting target device (not shown), or other component of the system without departing from the invention.

Figure 1B:
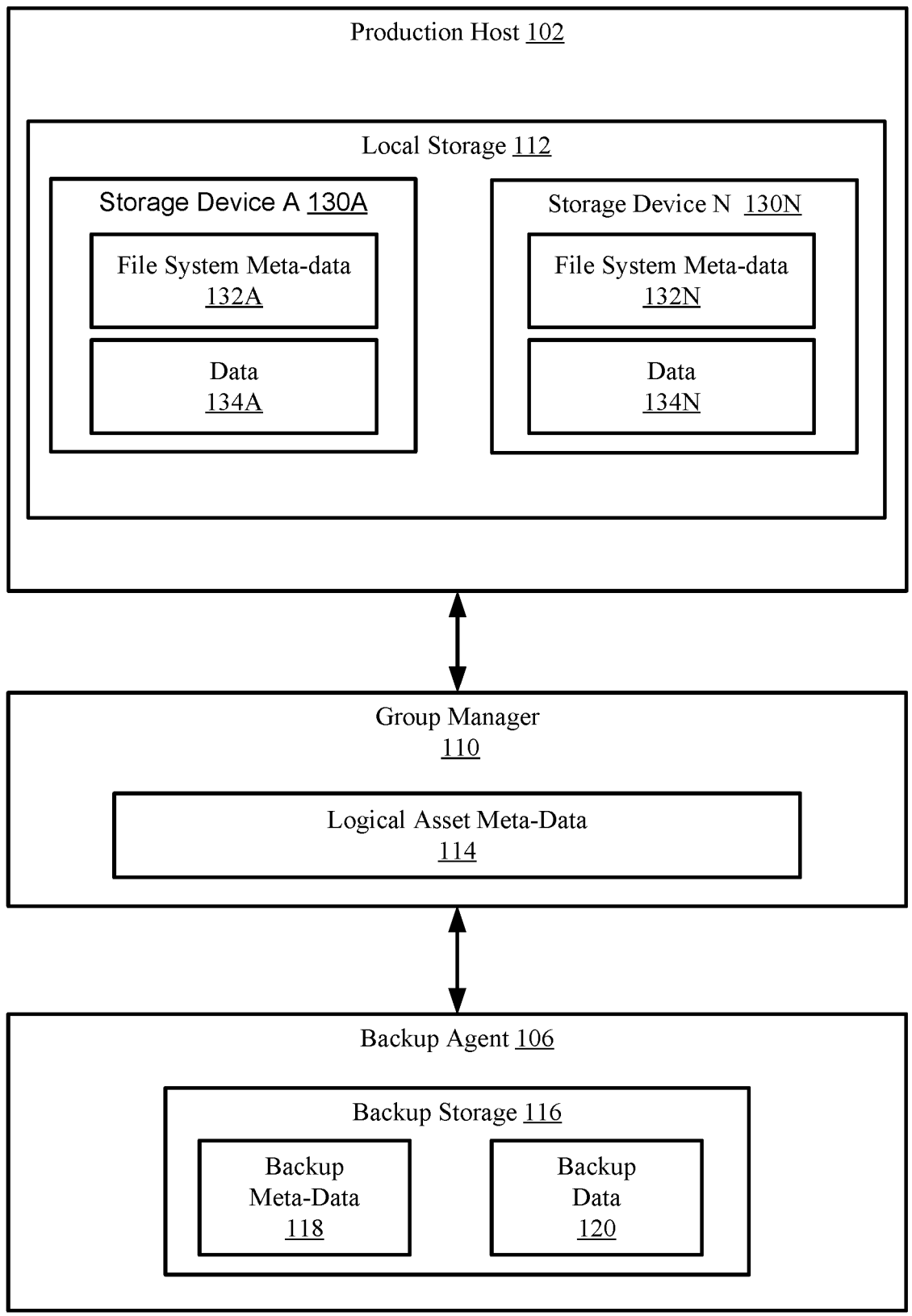
FIG. 1B shows a detailed diagram of a system for backing up a user defined logical asset in accordance with one or more embodiments of the invention.

Turning now to FIG. 1B, FIG. 1B shows a diagram of specific components utilized in performing a backup of a user defined logical asset located on at least one production host (e.g., 102) and a backup agent (e.g., 106) in accordance with one or more embodiments of the invention. The production host (e.g., 102) communicates with one or more backup agents (e.g., 106) and a group manager (e.g., 110). Each component illustrated in FIG. 1B is discussed below.

The production host (e.g., 102) may be similar to the production hosts (e.g., 102A-102N) as discussed above in reference to FIG. 1A. The production host (e.g., 102) may include VMs, a hypervisor, a production agent, and local storage (e.g., 112) that includes a plurality of storage devices (e.g., 130A-130N). The production host may include additional, fewer, and/or different components without departing from scope of the invention. Each component may be operably connected to any of the other component via any combination of wired and/or wireless connections.

As discussed above, the production host may provide computer implemented services to clients as well as the backup agent(s) (e.g., 106). To provide and obtain the aforementioned computer implemented services, the production host may include application(s) which are stored on the local storage (e.g., 112). The production host may include other and/or additional components without departing from the invention.

The production host (104) includes storage devices (e.g., 130A and 130N). The storage devices include a file system meta-data repository (e.g., 132A, 132N) and data (e.g., 134A, 134N). A file system meta-data repository (e.g., 132N) may be one or more data structures that include information regarding application data stored in the file system repository. The information included in the file system meta-data repository (e.g., 132A, 132N) in one or more embodiments of the invention may be determined as a normal function of the file system of each storage device (e.g., 130A-130N), as part of a meta-data-based backup (MBB), or other functions requested by any of the backup agent (e.g., 106), group manager (e.g., 110) or other components of the system.

The information included in the file system meta-data repository (e.g., 132A, 132N) in one or more embodiments of the invention may be used to for determining the files and folders that are associated with an asset, producing estimates of the size of files and folders associated with the asset and/or other functions such as performing a backup as will be described in more detail with regards to the method shown in FIG. 2. The file system meta-data repository (e.g., 132A, 132N) may include other and/or additional information without departing from the invention.

The storage devices (e.g., 130A, 130N), may include one or more data structures (e.g., 134A, 134N) that may contain the actual data associated with one or more applications. The storage devices (e.g., 130A, 130N) may include data (e.g., 134A, 134N also referred to as "asset data") generated by the hosts. The data may be any type of data such as, but not limited to, database data and email data generated by applications and/or their users. Each storage device (e.g., 130A-130N) may include any number of applications and associated data as well as assets not associated with a specific application such as user defined logical assets.

Each user defined logical asset may include any quantity of asset data and may be organized as files and folders or in other systems of organization. The user defined logical assets in one or more embodiments of the invention are not related to any single applications and are defined based on a file type, a characteristic, an attribute, and/or other rules provided by a user of the system.

In a non-limiting example, a user could define a logical asset as being all files in the form of a portable document format files (PDF). Other non-limiting examples are document files, database files, graphic files, and/or any other type of files. Other file types or characteristics could be used without departing from the invention.

In another non-limiting example, a user could define a logical asset as all files and folders that are assigned to a specific user or group of users. In yet another non-limiting example, a user could define a logical asset as being all files created or modified less than one day, one week, one month, or one year ago. Other period periods of time could be used without departing from the invention. Furthermore, each asset may include any number of elements without departing from the invention.

Users (e.g., individuals, administrators, or their proxies) operating or using the system may use the data (e.g., 134A and 134N), stored on the storage devices (e.g., 130A and 130N), when obtaining computer implemented services from the production host (e.g., 102). Additionally, the data (e.g., 134A and 134N), stored on the storage devices (e.g., 130A and 130N) of the production host (e.g., 104), may be obtained by a backup agent (e.g., 106) or other requesting device (not shown) to perform functions. The data (e.g., 134A and 134N) of the file system storage devices (e.g., 130A and 130N), may be used by other and/or additional entities for other and/or additional purposes without departing from the invention.

In one or more embodiments of the invention, a group manager (110) manages the production hosts. This may include such functions as tracking where assets and files are located on individual hosts (e.g., 102) and/or storage devices (e.g., 130A-130N) associated with the hosts (e.g., 102A-102N). As will be described in more detail below with regards to the method of FIG. 2, when a backup agent (e.g., 106) requests an asset, including a user defined logical asset, located on a host (e.g., 102) on one or more of its storage devices (e.g., 130A-130N), the group manager (110) utilizes the file-system meta-data (e.g., 132A-132N) located on each of the hosts (e.g., 102A-102N) to determine which files and folders are associated with the asset is located as well as information needed for using and/or transmitting the asset such as how large the asset is.

In one or more embodiments of the invention the meta-data associated with a user defined logical asset may be maintained in a storage for the logical asset meta-data (e.g., 114) associated with the group manager (e.g., 110). This may be a permanent storage for the meta-data, or temporary storage that maintains the logical asset meta-data for a predetermined period of time. For example, it may only be necessary to maintain the logical asset meta-data (e.g., 114) for the period of time it takes to perform a backup of the logical asset and once the backup is completed the logical asset meta-data (e.g., 114) may be purged. However, depending on the nature of the logical asset (such as but not limited to how often the underlying data changes), a user or administrator may specify to maintain the meta-data for a period of time so that a plurality of operations/backups may be performed with it. Further in one or more embodiments of the invention, the logical asset meta-data may be continuously or periodically updated to insure it is an accurate representation of the user defined asset and its associated files and folders.

In one or more embodiments of the invention, the backup agent (e.g., 106) as described in more detail above with regards to FIG. 1A, requests the asset from the production host (e.g., 102) or through an intermediary such as the group manager (e.g., 110). The backup agent (e.g., 106) may include its own storage (e.g., 116) for storing the backup data (e.g., 120) and associated meta-data for the backup (e.g., 118).

The backup agent (e.g., 106) may take the form of a physical device that may include circuitry. The physical device may be, for example, a field-programmable gate array, application specific integrated circuit, programmable processor, microcontroller, digital signal processor, or other hardware processor. The physical device may be adapted to provide the functionality of the backup agent (e.g., 106) as described throughout this application. In one or more embodiments of the invention, the backup agent (e.g., 106) is implemented as computer instructions, e.g., computer code, stored on a persistent storage that when executed by a client or user, causes a processor to provide the functionality of a backup agent (e.g., 106).

FIG. 2 shows a method of backing up a user defined logical asset in accordance with one or more embodiments of the invention. While the various steps in the method are presented and described sequentially, those skilled in the art will appreciate that some or all the steps may be executed in different orders, may be combined, or omitted, and some or all steps may be executed in a parallel manner without departing from the scope of the invention.

The method may be performed by, for example, a backup agent (e.g., 106, FIG. 1B) or alternatively by a group manager (e.g., 110, FIG. 1B), or an individual production host (e.g., 102A-102N, FIG. 1A). Other components of the system illustrated in FIGS. 1A and 1B may perform all, or a portion of the method of FIG. 2 without departing from the invention.

In step 200, a logical asset is defined by a user or administrator, or other party such as, in a non-limiting example, a backup application. The logical asset may be defined based on at least one of rules, filters and attributes of the files and folders stored in at least one of the production hosts (e.g., 102A-102N, FIG. 1A).

In one or more embodiments of the invention, the asset is defined in such a way that the files and/or folders included in the asset are not just those associated with a single application but rather may be associated with a plurality of different applications. For example, if the asset is defined as all PDFs, the asset could include files associated with a human resources (HR) application, individual user workspaces, word-processing applications, and/or any other applications which produce PDFs.

The asset in one or more embodiments of the invention may be defined by both its name and/or specific attributes such as a creation date or last modified date. For example, a user may desire to backup all files that have not been modified in thirty days but are less than a year old. In another example, a user may want to back up all email files for the past five years in order to meet retention policies. Another attribute that can be used, for example, is that an asset could be defined as those files and/or folders that are assigned to a specific user or group of users (such as, in a non-limiting example, all salespersons). Other definition and/or criteria for defining the user defined logical asset may be used without departing from the invention.

Once the logical asset is defined in step 200, the method proceeds to step 210. In step 210, meta-data is retrieved from the file system of one or more production hosts (e.g., 102A-102N, FIG. 1A). The meta-data in one or more embodiments of the invention may already be stored in the file system meta-data (e.g., 132A-132N, FIG. 1B), and/or in the invention the group manager (e.g., 110, FIG. 1B). In another embodiment of the invention, the backup agent (e.g., 106, FIG. 1B) may analyze and/or crawl the file system data (e.g., 134A-134N, FIG. 1B) to gather the meta-data for the file system (e.g., 132A-132N, FIG. 1B). Once the meta-data for the file system (e.g., 132A-132N, FIG. 1B) is retrieved, the method proceeds to step 220.

In step 220, the meta-data retrieved in step 210, is searched for files related to the logical asset as defined by the user in step 200. This step may be performed by a backup agent (e.g., 106, FIG. 1B), group manager (e.g., 110, FIG. 1B), or any other component of the system. The agent, manager, or component looks at the meta-data for specific attributes and/or file names that correspond to the logical asset as defined by the user. For example, if the user defined the logical asset as being all files and/or folders created or modified in the past two weeks, then the agent, manager, or component would look at the modification and/or creation dates of each file and folder as recorded in the meta-data and determined which ones meet the definition. Similarly in another non-limiting example, if the logical asset is defined as PDF type files, the agent, manager, or component would look at the file names and determine all the files that meet the definition of a PDF type file.

Once the agent, manager, or component, determines which files and/or folders meet the definition for the user defined logical asset, the agent, manager, or component, records the meta-data for the file and/or folder in an asset meta-data database in step 230. The meta-data associated with the files and/or folders that meet the criterion/criteria of the user defined logical asset (also referred to as "logical asset meta-data") is assigned a logical name related to the user defined logical asset and is stored in an asset meta-data database, which may be located in the storage of the group manager (e.g., 110, FIG. 1B). Other locations may be used to store the meta-data database then in storage of the group manager without departing from the invention.

When the logical asset is defined or at a later time after the logical asset meta-data is stored in the asset meta-data database, a request is received for a back-up to be performed of the user defined logical asset (also referred to as the "logical asset") in step 240. After the request is received and after the logical asset meta-data has been stored, the backup agent (e.g., 106, FIG. 1B) obtains the logical asset meta-data (e.g., 114, FIG. 1B) and in step 250, uses this logical asset meta-data to determine which files and folders of the file-system stored on one or more of the production hosts (e.g., 102A-102N, FIG. 1A) to backup. Once the files and folders of the file-system associated with the user defined logical asset are determined, the backup agent or other related component of the system, performs the backup of the user defined logical asset.

The method may end following step 250.

Additionally, as discussed above, embodiments of the invention may be implemented using computing devices. FIG. 3 shows a diagram of a computing device in accordance with one or more embodiments of the invention. The computing device (300) may include one or more computer processors (310), non-persistent storage (330) (e.g., volatile memory, such as random access memory (RAM), cache memory), persistent storage (340) (e.g., a hard disk, an optical drive such as a compact disk (CD) drive or digital versatile disk (DVD) drive, a flash memory, etc.), a communication interface (320) (e.g., Bluetooth interface, infrared interface, network interface, optical interface, etc.), input devices (360), output devices (350), and numerous other elements (not shown) and functionalities. Each of these components is described below.

In one embodiment of the invention, the computer processor(s) (310) may be an integrated circuit for processing instructions. For example, the computer processor(s) may be one or more cores or micro-cores of a processor. The computing device (300) may also include one or more input devices (360), such as a touchscreen, keyboard, mouse, microphone, touchpad, electronic pen, or any other type of input device. Further, the communication interface (320) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (350), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (310), non-persistent storage (330), and persistent storage (340). Many distinct types of computing devices exist, and the input and output device(s) may take other forms.

One or more embodiments of the invention may be implemented using instructions executed by one or more processors of the data management device. Further, such instructions may correspond to computer readable instructions that are stored on one or more non-transitory computer readable mediums.

The one or more embodiments of the invention described above may improve the operation of one or more computing devices by allowing a user more flexibility in choosing what is backed up during a backup. In one or more embodiments, the user is able to define a logical asset. Utilizing meta-data for the file system, the system or a backup-agent may efficiently determine which files and/or folders belonging to the user defined logical asset. Making it possible to efficiently perform a backup on a desired asset without significantly increasing the resources needed to perform the backup compared to traditional methods.

The problems discussed above should be understood as being examples of problems solved by embodiments of the invention disclosed herein and the invention should not be limited to solving the same/similar problems. The disclosed invention is applicable to address a range of problems beyond those discussed herein.

While the invention has been described with respect to a limited number of embodiments, those skilled in the art, having benefit of this disclosure, will appreciate that other embodiments may be devised which do not depart from the scope of the technology as disclosed herein. Accordingly, the scope of the invention should be limited only by the attached claims.

What is claimed is:

1. A method for backing up a user defined logical asset, the method comprising:
   receiving, from a user and by a backup agent, a definition for the user defined logical asset, wherein the user defined logical asset is defined by at least one of rules, filters, and attributes of files and folders stored in a file-system with at least two physical production hosts and wherein the user defined logical asset includes at least one folder or file from a first physical production host of the at least two physical production hosts and at least one folder or file from a second physical production host of the at least two physical production hosts;

analyzing, by the backup agent and in response to the receiving, file-system meta-data, to determine which of the files and the folders stored in the file-system are associated with the user defined logical asset,
   wherein the file-system meta-data is obtained prior to the analyzing using a group manager,
   wherein the file-system meta-data comprises file-system meta-data from the at least two physical production hosts,
   wherein the group manager obtains the file-system meta-data from the at least two physical production hosts by periodically querying the at least two physical production hosts to obtain information about assets on the at least two physical production hosts;
   wherein the assets comprises files and folders, wherein a folder comprises at least one file or at least one other folder,
   wherein the at least two physical production hosts are operatively connected to the group manager,
   wherein the group manager is a physical computing device interposed between the backup agent and the at least two physical production hosts,
   wherein the backup agent does not interact with the at least two physical production hosts during the analyzing;

storing logical asset meta-data for determined files and folders associated with the user defined logical asset to an asset meta-data database located on the group manager,
   wherein the logical asset meta-data is assigned a logical name related to the definition for the user defined logical asset;

receiving a request for a backup of the user defined logical asset after the logical asset meta-data is stored in the asset meta-data database; and backing up the user defined logical asset using the logical asset meta-data stored in the asset meta-data database,
   wherein only the determined files and folders that are stored in the at least two physical production hosts and that are associated with the user defined logical asset are backed up and wherein a backup of the user defined logical asset is stored in a backup storage of the backup agent separate from the at least two physical production hosts.

2. The method of claim 1, wherein the definition for the user defined logical asset comprises a file type.

3. The method of claim 1, wherein the definition for the user defined logical asset comprises at least one of a user selected creation date and a last modified date for the determined files and folders.

4. The method of claim 1, wherein the definition for the user defined logical asset comprises a specific user or group of users to which the determined files and folders are assigned.

5. The method of claim 1, wherein the definition for the user defined logical asset defines the files and the folders by name, creation date, and last modified date.

* * * * *